United States Patent [19]
Leivan

[11] Patent Number: 5,642,843
[45] Date of Patent: Jul. 1, 1997

[54] PULL OUT AND ROTATABLE CUP AND CAN HOLDER

[76] Inventor: Wayne L. Leivan, 19911 Edgewood La., Huntington Beach, Calif. 92649

[21] Appl. No.: 688,538

[22] Filed: Jul. 30, 1996

[51] Int. Cl.⁶ .................................................. B60N 3/10
[52] U.S. Cl. ................ 224/281; 224/282; 224/485; 224/926
[58] Field of Search ...................... 224/281, 282, 224/483, 485, 926, 42.01; 296/37.8, 37.12, 37.1; 211/70, 77, 78, 144

[56] References Cited

U.S. PATENT DOCUMENTS

| | | |
|---|---|---|
| 533,984 | 8/1895 | Houck ............................ 224/281 X |
| 1,915,958 | 6/1933 | Skirrow ............................ 224/926 |
| 3,163,287 | 12/1964 | Barnett ............................ 224/926 |
| 5,024,411 | 6/1991 | Elwell ............................ 224/926 |
| 5,060,899 | 10/1991 | Lorence et al. ............... 224/296 |
| 5,102,181 | 4/1992 | Pinkney ............................ 296/37.12 |

FOREIGN PATENT DOCUMENTS

| | | | |
|---|---|---|---|
| 405193405 | 8/1993 | Japan | 224/281 |
| 406092187 | 4/1994 | Japan | 224/281 |

*Primary Examiner*—Renee S. Luebke
*Attorney, Agent, or Firm*—Morland C. Fischer

[57] ABSTRACT

A pull out and rotatable cup and can holder to receive and restrain a coffee cup and a beverage can at respective first and second openings formed through first and second sides of a round base plate. The round base plate is slidably received in and rotatable relative to a frame that is mounted below a suitable flat surface of a vehicle (e.g. a boat, and the like) that is subjected to turbulence and similar mechanical forces during operation. The round base plate slides partially out of the frame to expose either the first or second openings for receiving and restraining a cup or a can. After the round base plate has been pulled partially out of the frame, it may be simply and easily rotated 180 degrees to correspondingly rotate and reposition the first and second openings formed therethrough. Once the cup or can is removed from the cup and can holder, the round base plate may be conveniently pushed inwardly of the frame so as to be disposed at a completely out of the way location therewithin.

10 Claims, 4 Drawing Sheets

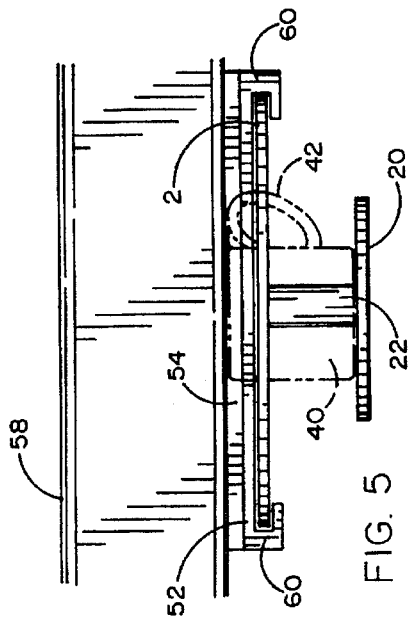
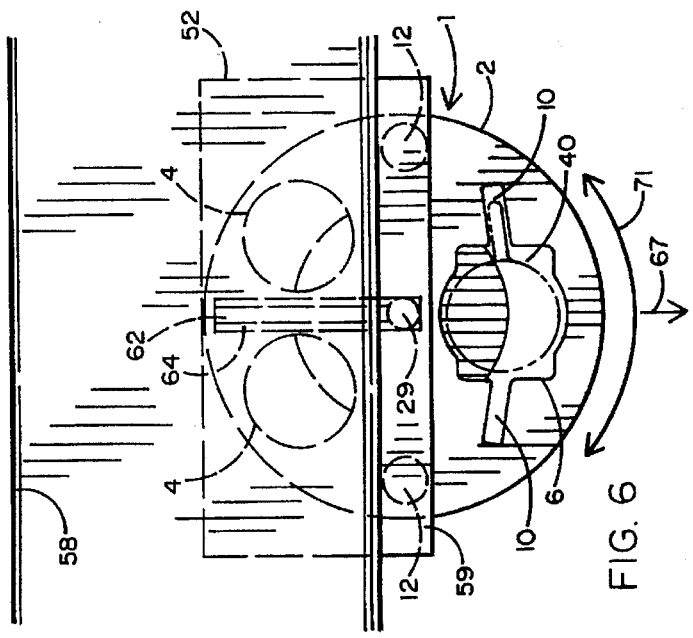
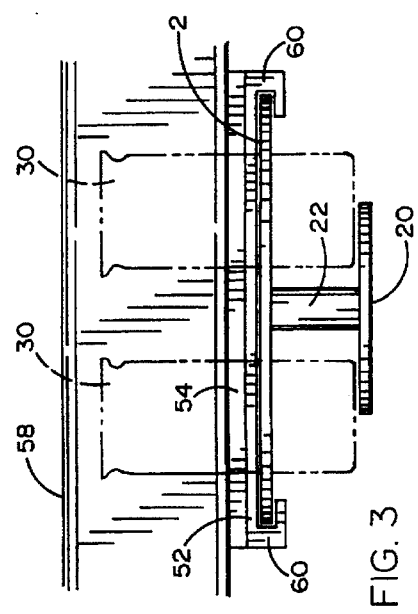
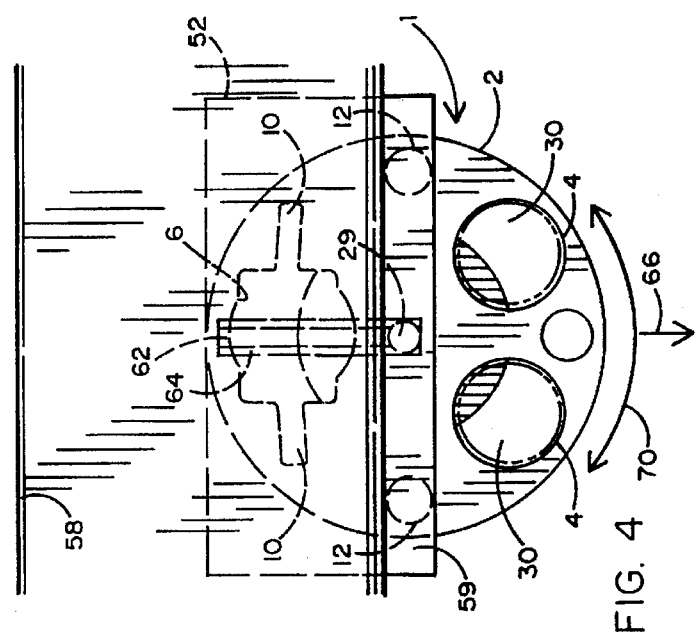

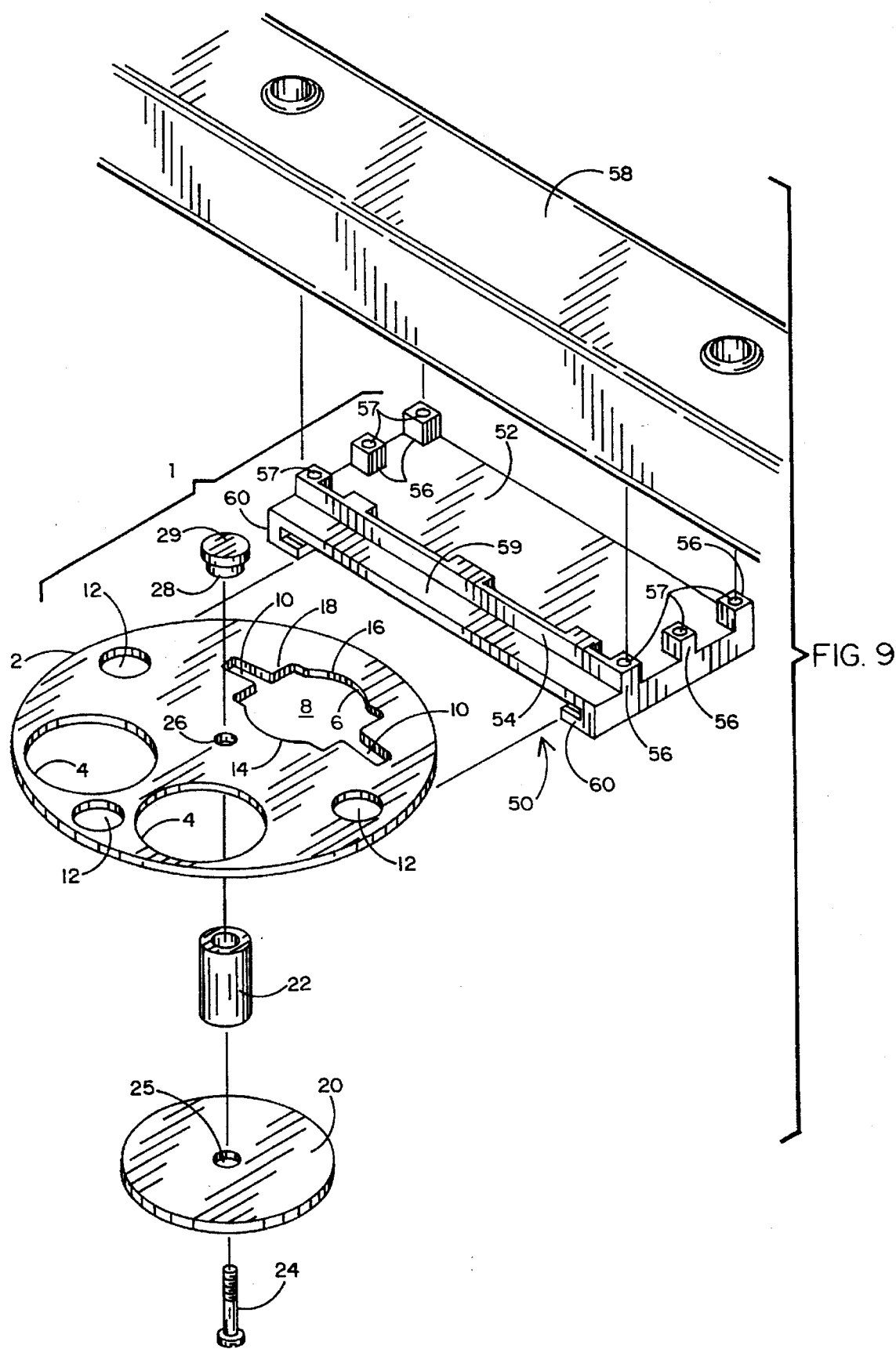

PULL OUT AND ROTATABLE CUP AND CAN HOLDER

BACKGROUND OF THE INVENTION

1. Field of the Invention

This invention relates to a cup and can holder having a round base plate that may be pulled in an outward direction from and rotated relative to a frame so as to receive a beverage can or a coffee cup at opposite sides of the base plate. The cup and can holder is particularly useful in moving vehicles (e.g. a boat, and the like) where it is necessary to restrain the cup and can that are otherwise subjected to turbulence and similar mechanical forces during operation of the vehicle.

2. Background Art

In my U.S. Pat. No. 5,383,586 granted Jan. 24, 1995, I disclosed an easy to use pull out cup and can holder that is adapted to restrain cans and cups of different size in a vehicle (e.g. a boat) so as to prevent the cup or can being restrained from tipping over and spilling its contents as a consequence of the vehicle being subjected to turbulence and similar mechanical forces. My patented cup and can holder is advantageously non-obtrusive, such that it can be installed at an out of the way location below almost any flat mounting surface without requiring an alteration to the surface.

A pair of round holes in which to receive respective beverage cans is formed through a first end of a rectangular base plate and an opening in which to receive a coffee cup is formed through the opposite end of the base plate. The rectangular base plate is supported within and pulled partially out of a frame to expose either the holes or the opening depending upon whether a cup or a can is to be restrained. During use of my patented cup and can holder, it is necessary to pull the rectangular base plate completely out of its frame so that the base plate can be turned around and then returned to the frame with the holes or opening at the rear of the base plate now located at the front, and vice versa.

The steps of having to remove, turn and then replace the rectangular base plate have proven, on occasion, to be inconvenient and time consuming. Moreover, the base plate might become separated from its frame and misplaced, whereby to render the cup and can holder unusable. Accordingly, an improvement to my earlier cup and can holder would be desirable to avoid the aforementioned shortcomings.

SUMMARY OF THE INVENTION

A pull out and rotatable cup and can holder is disclosed to receive and restrain beverage cans and cups carrying cold and hot beverages. The cup and can holder is suitable for use in a moving vehicle (e.g. a boat, and the like) which is subjected to turbulence and similar mechanical forces during operation. By virtue of the foregoing, it is possible to stabilize the cup or can against movement and tipping over and thereby avoid the possibility that the beverage carried therewithin will be spilled.

The cup and can holder which forms my present invention includes a flat and round base plate. A pair of round holes are formed through a first side of the base plate to receive beverage cans therein, and an opening is formed through the opposite side of the base plate to receive a cup therein. A rest is spaced below the base plate by means of a spacer extending therebetween. The rest is located underneath at least some portion of each of the holes and the opening formed through the base plate so as to block the cans and cup received in the holes and opening from falling completely therethrough.

A frame having a pair of inwardly turned guide channels running along opposite sides thereof is mounted under a suitable flat surface of the vehicle. The round base plate is slidably received by the guide channels of the frame so that the base plate can be moved inwardly to an out of the way location within the frame. The base plate can also be pulled in an outward direction from the frame when it is desirable to place a can or a cup in a hole or the opening disposed through opposite sides of the base plate. At the same time that the base plate slides in and out of the frame, an end cap of the spacer that is seated atop the base plate is adapted to ride through and rotate within a longitudinally extending groove formed in the bottom of the frame and located midway between the opposing guide channels. The receipt of the end cap within the groove prevents the base plate from being pulled completely out of and separated from the frame.

During use of the cup and can holder, should the user change his mind after pulling the round base plate outwardly from the frame and wish to expose the holes rather than the opening, or vice versa, he simply rotates the base plate by 180 degrees, whereby to correspondingly rotate and reposition the holes and the opening therethrough. Accordingly, the round base plate will rotate within the guide channels and the end cap of the spacer will simultaneously rotate within the groove of the frame to facilitate the rotation of the base plate relative to the frame.

BRIEF DESCRIPTION OF THE DRAWINGS

FIG. 3 is a front elevational view showing the round base plate pulled partially out of its supporting frame to receive and restrain cans;

FIG. 4 is a top plan view showing the round base plate of FIG. 3 pulled partially out of its supporting frame to receive and restrain the cans;

FIG. 5 is a front elevational view showing the round base plate pulled partially out of its supporting frame to receive and restrain a cup;

FIG. 6 is a top plan view showing the round base plate of FIG. 5 pulled partially out from its supporting frame to receive and restrain the cup;

FIG. 9 is an exploded view of the pull out and rotatable cup and can holder which forms this invention.

DETAILED DESCRIPTION

Figure 1:
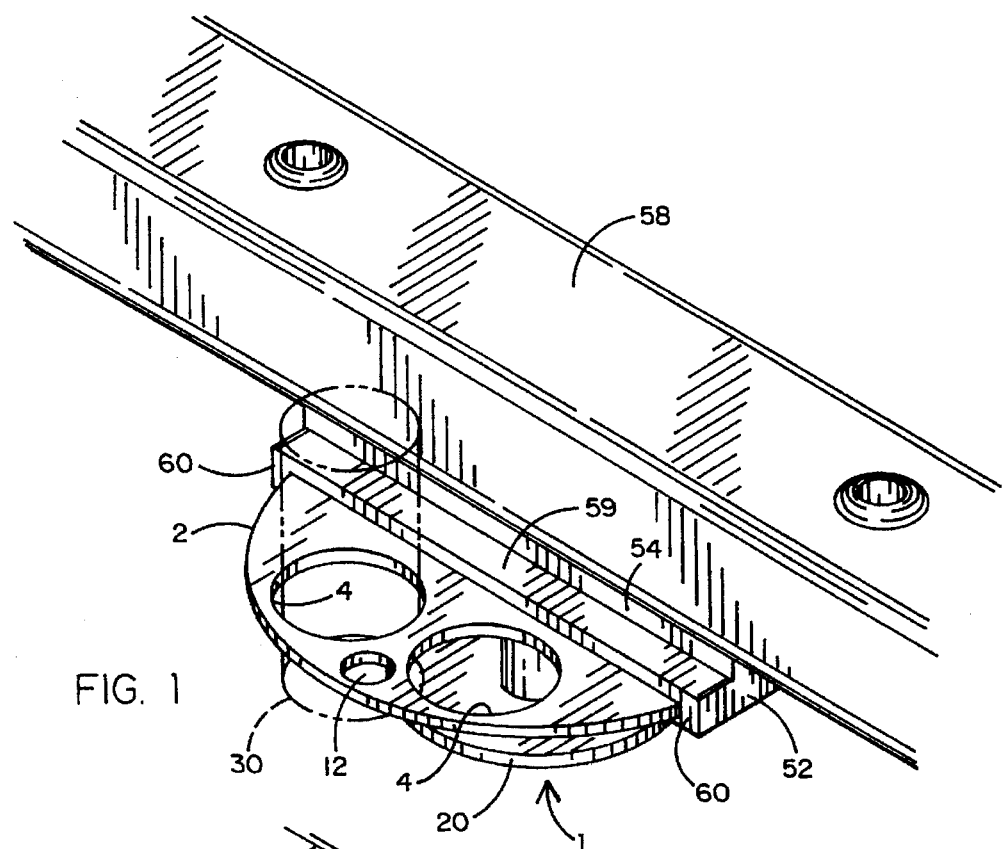
FIG. 1 is a perspective view of the pull out and rotatable cup and can holder which forms the present invention with a round base plate pulled partially out of its supporting frame to expose a pair of holes in which to receive a respective pair of cans.
Figure 2:
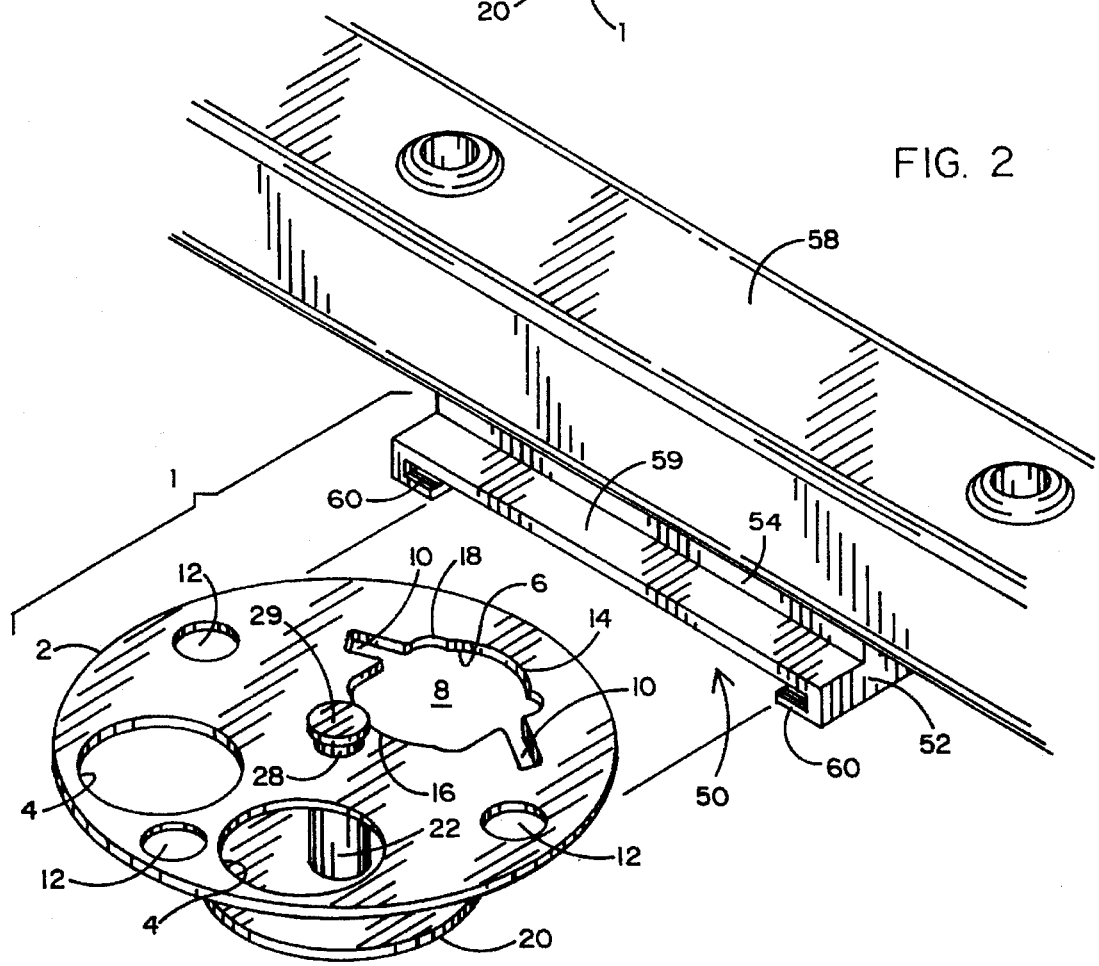
FIG. 2 is a partially exploded view of the pull out and rotatable cup and can holder of FIG. 1.

The pull out and rotatable cup and can holder 1 which forms the present invention is now described in detail while referring concurrently to FIGS. 1–9 of the drawings. The cup and can holder 1 includes a flat and round base plate 2. As is best shown in FIGS. 2 and 9, a pair of round holes 4 are formed through one side of the base plate 2. Each hole 4 has a diameter that is sized to receive therethrough and restrain therewithin a conventional can (shown in phantom lines in FIGS. 1, 3 and 4 and designated by the reference numeral 30). By way of example, the can 30 may contain a cold beverage including beer, a soft drink, or the like. In addition, the holes 4 are also adapted to receive tall glasses (not shown). Although a pair of holes 4 are formed through the base plate 2 to receive respective cans 30, it is to be understood that base plate 2 can have more or less than the two holes 4 that are shown, depending upon the size (e.g. diameter) of the round base plate 2.

An opening 6 is formed through a side of the round base plate 2 that lies opposite the side at which the holes 4 are formed. The opening 6 includes a central space 8 that communicates with a pair of finger-like projections 10. The finger-like projections 10 of opening 6 extend outwardly from the central space 8 in generally opposite directions from one another. The central space 8 of opening 6 is surrounded by front and rear walls having rounded ridges 14 and 16 formed therein so as to be adapted to receive therethrough and restrain therewithin a conventional cup or mug (shown in phantom lines in FIGS. 5 and 6 and designated by the reference numeral 40). By way of example, such a cup 40 which typically has a handle 42 projecting from a side thereof, may contain a hot beverage including coffee, tea, soup, and the like.

With the cylinder of the cup 40 received in the central space 8 and against the rounded ridges 14 and 16 in the walls thereof, the handle 42 of the cup 40 will be seated within one of the finger-like projections 10, depending upon the location and/or wishes of the user. Thus, and by virtue of the projections 10, the alignment of the cup 40 in opening 6 will be conveniently maintained even when the vehicle to which the cup and can holder is affixed is subjected to vibration and similar mechanical forces. Although the opening 6 through the base plate 2 has been described as holding a cup or a mug 40 having a handle 42, it is also possible to carry a relatively wide glass with or without a handle (not shown). What is more, the corners 18 of the walls surrounding the central space 8 of opening 6 are relatively square to permit the opening 6 to also receive and restrain containers having a rectangular configuration such as a milk carton (also not shown).

A set of additional round holes 12, the diameter of which is smaller than the diameter of the holes 4 for receiving cans 30, is also formed through the base plate 2. Holes 12 are sized to receive and conveniently hold tools (not shown) or other objects so that they will be readily accessible to the user after he has consumed his beverage.

To prevent the can 30 and the cup 40 from dropping completely through the respective holes 4 and opening 6 in which they are held at opposite sides of the round base plate 2, a rest 20 is spaced below the base plate 4 of the cup and can holder 1 so as to lie beneath at least some of the holes 4 and opening 6. Although the rest 20 is illustrated as being round, this is for the purpose of example only. That is, the rest 20 may have other shapes, provided that the rest will lie under at least some portion of each of the holes 4 and opening 6 in base plate 2 so as to be able to engage and support any can 30 or cup 40 being restrained therein.

In this regard, the rest 20 is held below the base plate 2 in spaced alignment with the holes 4 and the opening 6 by means of a hollow, cylindrical spacer 22. A fastener (e.g. a long threaded bolt 24 shown in FIG. 9) extends through a hole 25 in the rest 20, the hollow spacer 22 and a hole 26 in the base plate 2. A threaded end cap 28 having an enlarged head 29 is mated to the bolt 24 to prevent the removal of bolt 24 and the separation of the rest 20, spacer 22 and base plate 2 from one another. However, it is also within the scope of this invention to mold the rest 20 and spacer 22 together as a single piece. In this case, the end cap 28 would be attached to spacer 22 by means of a fastener (not shown) extending through the hole 26 in base plate 2.

By virtue of the rest 20, each can 30 or cup 40 will be blocked from falling completely through its respective hole 4 or opening 6 in the base plate 2 of cup and can holder 1. To this end, the length of the spacer 22 (preferably about two inches) is chosen so that enough of the can 30 and/or the cup 40 will extend above the top of the base plate 2 to permit such can or cup to be easily grasped and quickly removed by the user.

The cup and can holder 1 of this invention is affixed to the interior of a vehicle (e.g. a boat) by means of a frame 50. More particularly, and as is best shown in FIG. 9, the frame 50 includes a flat support plate 52. An elongated rib 54 runs laterally across the top of the support plate 52. A plurality of support blocks 56 project upwardly from the top of the support plate 52. A hole 57 extends through each of the support blocks 56. In the assembled configuration, the frame 50 is mounted underneath a flat surface 58, such as a table, a counter top, or the like, with the top of the support plate 52 lying below the flat surface 58 and the elongated rib 54 and support blocks 56 engaging the underside of surface 58. A set of fasteners (not shown) are inserted through respective holes 57 in the support blocks 56 in order to secure the frame 50 to the flat surface 58. In this regard, and as shown in FIGS. 1 and 2, it may be appreciated that with the frame 50 affixed below the flat surface 58 in the manner just described, a short portion 59 of the support plate 52 will extend outwardly and beyond the flat surface 58.

A pair of inwardly turned guide channels 60 project downwardly from the bottom of the support plate 52 of frame 50. The guide channels 60 run in parallel alignment with one another along opposite sides of the support plate 52. As will soon be disclosed, the guide channels 60 of support plate 52 advantageously cooperate with the round base plate 2 so that plate 2 can be moved outwardly and inwardly and rotated relative to the frame 50.

More particularly, a relatively narrow, longitudinally extending groove 62 (best shown in FIG. 8) is formed in the bottom of the support plate 52 of frame 50. The groove 62 is located midway between the guide channels 60 that run along the bottom and opposite sides of the support plate 52. The longitudinally extending groove 62 expands into a relatively wide slot 64. During assembly of the cup and can holder 1, the end cap 28 that is mated to the threaded bolt 24 is disposed within the narrow groove 62 in support plate 52 such that the enlarged head 29 thereof is captured by the wide slot 64. The end cap 28 is adapted to ride back and forth through the groove 62 and the enlarged head 29 of end cap 28 is adapted to rotate within the wide slot 64 to permit the round base plate 2 to be relocated (i.e. slide and rotate) relative to the frame 50.

Once the end cap 28 is coupled to the groove 62 at the bottom of support plate 52, the opposite ends of the groove 62 are closed or sealed, whereby to block the end cap 28 from riding out of the groove 62 and undesirably separating the round base plate 2 from the support plate 52. That is to say, with the head 29 of end cap 28 captured by the slot 64 of groove 62 and the opposite ends of the groove 62 being closed, the base plate 2 cannot be pulled completely out of and detached from the frame 50 that is mounted underneath the flat surface 58.

In operation, the base plate 2 of the cup and can holder 1 may be pushed inwardly through the frame 50 (in the direction of the reference arrow 65 of FIG. 7) so as to lie under the support plate 52 at a location that is completely below the flat surface 58. In this case, the base plate 2 will be hidden from view at a non-obtrusive, out of the way position within the frame 50.

When it is desirable to place a can 30 within the cup and can holder 1, the base plate 2 is pulled outwardly from the frame 50 (in the direction of the reference arrow 66 of FIG. 4) until the holes 4 in base plate 2 are accessible to the user. Of course, base plate 2 can also be pulled outwardly from the frame 50 (in the identical direction represented by the reference arrow 67 of FIG. 6) to expose the opening 6 in the base plate 2 when it is otherwise desirable to place a cup 40 in the cup and can holder 1.

Figure 7:
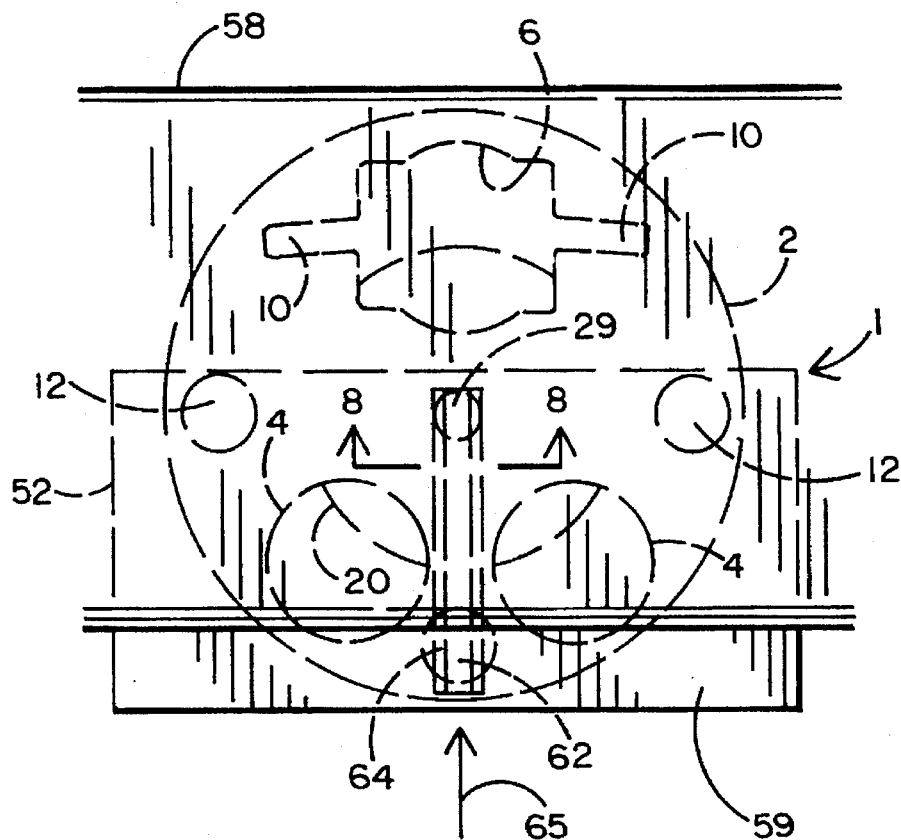
FIG. 7 shows the round base plate pushed completely inward of its supporting frame to be disposed at an out of the way location.
Figure 8:
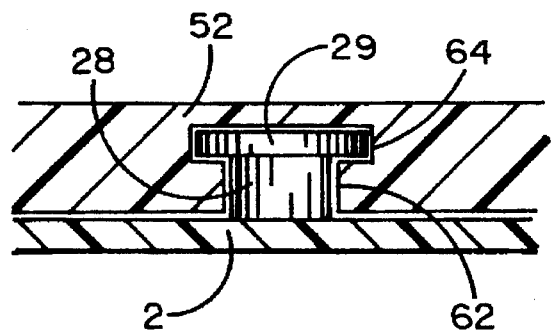
FIG. 8 is a cross-section taken along lines 8—8 of FIG. 7.

Whenever the round base plate 2 is pushed into the frame 50 (as shown in FIG. 7) or pulled partially out of the frame 50 (as shown in FIGS. 4 and 6) for any of the aforementioned reasons, the base plate 2 will slide along the bottom of the support plate 52 within the opposing guide channels 60 by which to assure both smooth and even travel. At the same time, end cap 28 will correspondingly ride through the groove 62 at the bottom of support plate 52 until a closed end of the groove 62 blocks the continued travel of end cap 28 therethrough and any further linear displacement of the base plate 2 relative to the frame 50.

Oftentimes, after the round base plate 2 has been pulled partially out of the frame 50 to expose the holes 4, the user may change his mind and, instead, wish to expose the opening 6, or vice versa. In this case, it is not necessary to first return the base plate 2 to its out of the way location within the frame 50. By virtue of the present invention, the round base plate 2 is simply and easily rotated 180 degrees (in either one of the identical directions represented by the reference arrows 70 and 71 in FIGS. 4 and 6), whereby to correspondingly rotate the holes 4 or opening 6 so as to be accessible to the user.

Accordingly, the round base plate 2 will rotate around the bottom of the support plate 52 of frame 50 within the opposing guide channels 60. Moreover, the relatively large head 29 of end cap 28 will simultaneously rotate within the relatively wide slot 64 of groove 62. Rotation of the round base plate 2 will continue until the desired access to the holes 4 or opening 6 is achieved. Once the user is finished and his can 30 or cup 40 is removed from the cup and can holder 1, the base plate 2 may be pushed completely inward of the frame 50 (in the direction represented by the reference arrow 65 of FIG. 7) until it is once again desirable to use the cup and can holder for any of the purposes that have been described above.

It will be apparent that while a preferred embodiment of the invention has been shown and described, various modifications and changes may be made without departing from the true spirit and scope of the invention. For example, although the vehicle to which the cup and can holder 1 of this invention is to be mounted has been described as being a boat, this is for example only, and it is to be understood that the frame 50 for slidably and rotatably receiving the round base plate 2 may be mounted within any passenger vehicle including, but not limited to, an airplane, an automobile, and the like.

Having thus set forth the preferred embodiment of the present invention, what is claimed is:

1. A cup and can holder, comprising:
a round base plate having a first side and a second side, a first opening having a first size to receive a can being formed through the first side of said round base plate, and a second opening having a second size to receive a cup being formed through said second side;
frame means adapted to be mounted on a substantially flat support surface to receive therewithin said round base plate, said round base plate being slidable partially out of said frame means to expose either said first opening through said first side of said round base plate for receiving the can or said second opening through said second side of said round base plate for receiving the cup depending upon whether said first side or said second side of said round base plate slides out of said frame means; and means by which to support said round base plate for rotating relative to said frame means after said round base plate slides partially out of said frame means so that said first and second openings are correspondingly rotated.

2. The cup and can holder recited in claim 1, wherein said frame means includes a support plate to be mounted to the support surface and a pair of guide channels located at opposite sides of said support plate and turning inwardly towards one another, said round base plate extending between said pair of guide channels to be slidable and rotatable relative to said support plate.

3. The cup and can holder recited in claim 2, further comprising rest means spaced from said round base plate and located beneath at least some portion of each of said first and second openings through said round base plate to block a can or a cup received in said first or second openings from falling completely therethrough, and a spacer connected between said round base plate and said rest means to hold said rest means below said round base plate.

4. The cup and can holder recited in claim 3, further comprising coupling means projecting axially from said round base plate, said support plate of said frame means having a groove formed therein in which to receive said coupling means so as to couple said round base plate to said support plate, said coupling means riding along said groove and rotating within said groove when said round base plate slides partially out of said frame means and when said round base plate rotates relative to said frame means.

5. The cup and can holder recited in claim 4, wherein said groove in said support plate of said frame means extends in parallel alignment with and is located midway between said pair of guide channels of said support plate.

6. The cup and can holder recited in claim 4, wherein said groove formed in said support plate has a pair of opposite ends that are closed so as to block said coupling means from riding out of said groove past one of the opposite ends thereof to thereby prevent said round base plate from being uncoupled from said support plate.

7. The cup and can holder recited in claim 4, wherein said coupling means has a relatively small body and a relatively large head, and said groove formed in said support plate expands into a relatively wide slot, the relatively small body of said coupling means being received by said groove and the relatively large head of said coupling means being received in and captured by the relatively wide slot into which said groove expands so as to couple said round base plate to said support plate and thereby prevent the separation of said round base plate from said support plate.

8. The cup and can holder recited in claim 4, wherein said coupling means is a fastener extending between said round base plate and said spacer to connect said round base plate to said spacer, said fastener projecting outwardly from said round base plate to be received by said groove formed in said support plate.

9. The cup and can holder recited in claim 1, wherein said first opening formed through said first side of said round base plate has a circular configuration.

10. The cup and can holder recited in claim 1, wherein said second opening formed through said second side of said round base plate has a configuration to receive a cup having a handle, said configuration including a central space for receiving the body of the cup and a finger-like projection extending outwardly from said central opening for receiving the handle of the cup.

* * * * *